(12) United States Patent
Jackson

(10) Patent No.: US 8,983,273 B2
(45) Date of Patent: Mar. 17, 2015

(54) SELECTIVELY RECORDING MEDIA CONTENT

(75) Inventor: Dean K. Jackson, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 67 days.

(21) Appl. No.: 13/225,027

(22) Filed: Sep. 2, 2011

(65) Prior Publication Data

US 2013/0058632 A1  Mar. 7, 2013

(51) Int. Cl.
*H04N 5/76* (2006.01)
*H04N 21/4147* (2011.01)
*H04N 21/433* (2011.01)
*H04N 21/4335* (2011.01)
*H04N 21/472* (2011.01)

(52) U.S. Cl.
CPC ............ *H04N 5/76* (2013.01); *H04N 21/4147* (2013.01); *H04N 21/4334* (2013.01); *H04N 21/4335* (2013.01); *H04N 21/47214* (2013.01)
USPC .................................... 386/296; 386/E5.001

(58) Field of Classification Search
CPC ............ H04N 21/4334; H04N 21/422; H04N 21/4227
USPC ............................................. 386/296, E5.001
See application file for complete search history.

(56) References Cited

U.S. PATENT DOCUMENTS

| | | | |
|---|---|---|---|
| 4,769,697 A | 9/1988 | Gilley et al. | |
| 6,710,740 B2 | 3/2004 | Needham | |
| 6,741,790 B1 | 5/2004 | Burgess | |
| 7,848,765 B2 | 12/2010 | Phillips et al. | |
| 7,908,083 B2 | 3/2011 | Peters et al. | |
| 2003/0005448 A1* | 1/2003 | Axelsson et al. | 725/58 |
| 2003/0061239 A1* | 3/2003 | Yoon | 707/104.1 |
| 2003/0135608 A1* | 7/2003 | Bodin et al. | 709/224 |
| 2004/0003392 A1 | 1/2004 | Trajkovic et al. | |
| 2004/0008255 A1 | 1/2004 | Lewellen | |
| 2006/0055521 A1 | 3/2006 | Blanco et al. | |
| 2007/0033607 A1* | 2/2007 | Bryan | 725/10 |
| 2007/0038349 A1 | 2/2007 | Larschan et al. | |
| 2010/0173616 A1* | 7/2010 | Romano | 455/414.1 |
| 2011/0211813 A1* | 9/2011 | Marks | 386/297 |
| 2011/0279311 A1* | 11/2011 | Hamano | 342/357.25 |

OTHER PUBLICATIONS

International Search Report and Written Opinion for PCT/US2012/053206, mailing date Dec. 28, 2012, 9 pages.
International Preliminary Report on Patentability dated Mar. 4, 2014 in International Patent Application No. PCT/US2012/053206.

* cited by examiner

*Primary Examiner* — Thai Tran
*Assistant Examiner* — Girumsew Wendmagegn
(74) *Attorney, Agent, or Firm* — Byrne Poh LLP

(57) ABSTRACT

An implementation of the subject matter described in this specification provides systems and methods for selectively recording media content. User preference data associated with media content may be stored, and a recording status associated with a media content item may be determined. A recording status indicates whether the media content item will be recorded by a digital recording device. A location associated with a user may also be determined, and the recording status associated with the media content item may be changed based at least in part on the determined location.

21 Claims, 7 Drawing Sheets

SELECTIVELY RECORDING MEDIA CONTENT

BACKGROUND

Digital Video Recorder (DVR) systems are configured to present media content transmitted via one or more content sources, such as cable, satellite, broadcast or Internet sources, to a user using various content reproduction devices as the content is received by the DVR system. DVR systems also allow media content to be recorded from a variety of media sources for later viewing or listening based on programming information received from a user. For example, users often program DVR devices to record content when they know that they will be unavailable so that they are able to access it at a later time that is more convenient. Typically, users program DVR devices using a remote control device to control operation of the DVR device, including browsing available content, recording content, and playing back stored content or content being delivered in real-time from a content source. DVR devices are typically configured to store media content on an internal memory device, such as an internal hard disk, that allows a user to access recorded media content multiple times at a convenient time rather than having to view or listen to the content when it is initially transmitted from the content source. If a user attempts to exceed the storage capacity of their DVR device, typically, the DVR device will inform the user that the storage space would be exceeded and cannot be programmed to record the content until additional storage space becomes available.

SUMMARY

In general, an implementation of the subject matter described in this specification provides systems and methods for selectively recording media content. User preference data associated with media content may be stored, and a recording status associated with a media content item may be determined. A recording status indicates whether the media content item will be recorded by a digital recording device. A location associated with a user may also be determined, and the recording status associated with the media content item may be changed based at least in part on the determined location. Other implementations of the described subject matter provide systems and computer programs configured to perform the actions of the methods, encoded on computer storage devices.

These and other implementations may include a geolocation service, a digital recording device, a recording control device, and mobile devices configured to transmit, receive, and store information associated with users and media content.

The details of one or more implementations of the subject matter described in this specification are set forth in the accompanying drawings and the description below. Other features, aspects, and advantages of the subject matter will become apparent from the description, drawings, and the claims.

BRIEF DESCRIPTION OF THE DRAWINGS

Like reference numerals and designations in the various drawings indicate like elements.

DETAILED DESCRIPTION OF EXEMPLARY IMPLEMENTATIONS

Figure 1:
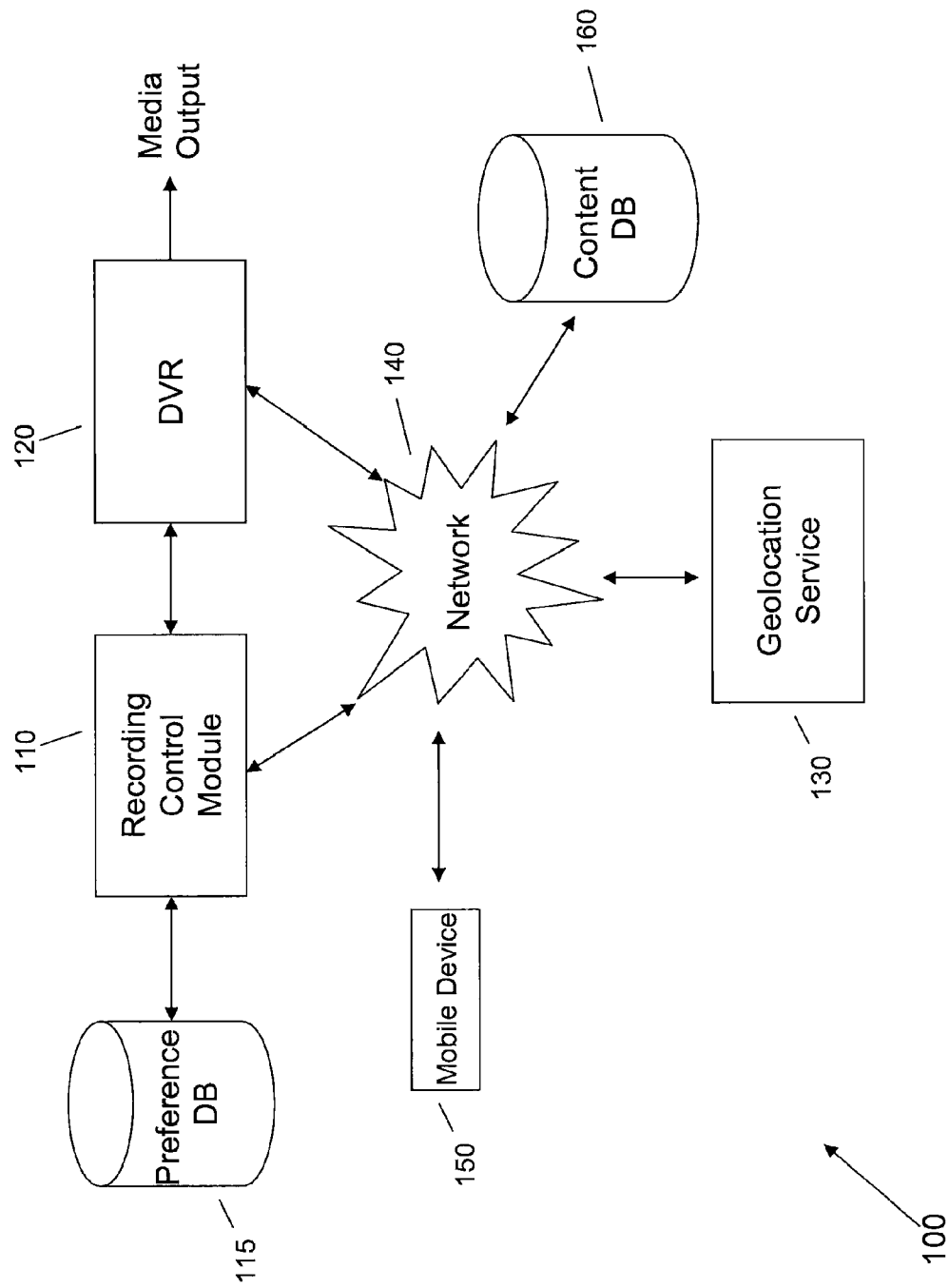
FIG. 1 is a block diagram of an example environment in which a content delivery system accesses and records content using geolocation information.

FIG. 1 shows an exemplary implementation of a content delivery system 100. Content delivery system 100 may be configured to include a recording control device, such as recording control module 110, a preference database 115, a digital recording device, such as DVR device 120, a geolocation service 130, one or more networks 140, a mobile device 150, and/or a content database 160. In an implementation, recording control module 110 may be configured as a hardware module and/or a software module operatively coupled to or integrated within DVR device 120 to facilitate the recording of content accessible via network 140. For example, recording control module 110 may be a hardware module connected to an interface port of DVR device 120 to change recording behavior or status associated with DVR 120. As another example, recording control module 110 and/or DVR 120 may operate on devices, systems, or servers remote from each other and may communicate over one or more networks. Recording control module 110 and/or DVR 120 also may be located at or remote from a content viewing location, such as a home. In an exemplary implementation, recording control module 110 may input information to DVR device 120 to cause DVR device 120 to change a recording status of at least one available media content item. In one example, the recording control module 110 may be configured to query preference database 115 for preference data regarding one or more users. The retrieved data may be used to select content available via network 140 or other inputs to DVR device 120 that matches the users' preferences and change a recording status associated with the content such that DVR device 120 records the content. Network 140 may be any wired or wireless computer network, such as a Local Area Network (LAN), a Wide Area Network (WAN), the Internet, or some combination thereof. Network 140 may comprise a cable television network, satellite television network, digital subscriber line (DSL) television network, or other networks. The network 140 may connect one or more devices, such as recording control module 110, DVR device 120, geolocation service 130, and mobile device 150.

Recording control module 110 and/or DVR device 120 may be configured to communicate with one or more content sources, such as content database 160, via network 140. In one implementation, content database 160 contains media content accessible to a user via DVR device 120, which allows the user to view, record, or otherwise manipulate selected content. For example, DVR device 120 may receive and present multimedia content, such as television programming, via an interface displayed to the user that allows the user to view available programming (e.g., via a directory of programs which may display channel, title, a brief synopsis, etc.), record one or more available programming items, or perform other functions related to the available programming items. According to another aspect, recording control module 110 may communicate with content database 160 via network 140 to determine available programming items. Recording control module 110 may use information received from content database 160 to change recording settings associated with content items on DVR device 120 based on additional information received from preference database 115.

In one implementation, preference database 115 may be configured to store data associated with a user's content preferences. Preference database 115 may be integrated with or operatively coupled to recording control module 110 via internal or external communications ports or interfaces designed to facilitate data transfer. In one example, preference database 115 may be integrated with recording control module 110 and is configured to store preference data associated with the viewing and recording behavior of one or more users. Preference database 115 may be configured as one or more relational databases that store content names, content types, genres, keywords, and timing information associated with each content item viewed or recorded by a user via DVR device 120. Preference database 115 may further retrieve and store preferences of a user and/or people within the user's circles of friends, family, etc., stored at other sources, such as one or more social networking sites, or other web sites (e.g., Facebook "likes"). The system may allow a user to opt-in or opt-out of the retrieval, storage and/or use of such user preference data. Recording control module 110, in an implementation, may be configured to query preference database 115 using Structured Query Language (SQL) or other programming languages adapted to communicate with preference database 115 to determine whether one or more available content items may match preference data associated with the user. Preference database 115 may also comprise multiple databases, including relational and non-relational database structures, and may be co-located with recording control module 110 or accessible by recording control module 110 via network 140. More specifically, according to one aspect, preference database 115 comprises a non-relational database that includes one or more relational table data structures associated with the non-relational database that are used by recording control module 110 to store and access data.

Recording control module 110 also may be configured to communicate via network 140 with one or more geolocation services, such as geolocation service 130. In various implementations, geolocation service 130 may be associated with devices, services, computer applications, or physical locations configured to provide location information, such as coordinate data, identification information, address information, or other information associated with user locations that may aid in the identification of the location of a user. Recording control module 110 may be configured to allow the user to opt in or opt out of such location-based features and to limit the ability of recording control module 110 to communicate with geolocation service 130. For example, a service such as Google Latitude may provide information regarding a user's current location if the user has configured recording control module 110 by, for example, opting-in to allow recording control module 110 to query Google Latitude for location information. Other examples of location-based services may include social-media or event services, such as websites or applications, which allow users to "check-in" or register their current location. According to certain implementations, recording control module 110 may be configured to store identification information associated with user location information. For example, recording control module 110 may store a "home" location, a "work" location, a "school" location, or other locations associated with users' activities based on input from the user. In another example, recording control module 110 may receive location identification information (e.g. "home," "work," etc.) directly from the geolocation service 130, such that recording control module 110 may use the identifier (e.g. "home") received from the geolocation service 130 for further processing.

Mobile device 150 is a user device configured to communicate with other devices using data networks, such as network 140. According to various implementations, mobile device 150 may include a laptop computer, notebook computer, handheld device, such as a mobile phone or smartphone, tablet device, or other computing device that may be configured to facilitate communication with a user, including content information and location information. According to one aspect, mobile device 150 may be configured to execute a software application configured to generate location status information that may be communicated via a data network, such as network 140. For example, mobile device 150 may execute an application that communicates with one or more Global Positioning System (GPS) devices to determine the current location of the device. Alternative location determination devices or circuits are contemplated, such as, using wireless signals received from devices having a known location, assisted GPS, cell tower triangulation, cell tower triangulation, cell tower identity, a user's "check-in" on a social networking web site, etc. Mobile device 150 may then transmit the location data, including GPS information such as coordinate information, elevation, direction or rate of travel, or other information, via network 140 to other devices, such as a geolocation service 130 or recording control module 110. In some implementations, mobile device 150 may be configured to determine location information based on available signal information associated with the mobile device 150's connection to network 140 or other network. Mobile device 150 may use signal strength, available network connectivity, or other information to "triangulate" or otherwise determine the current location.

In another example, mobile device 150 may execute an application to present the user with an interface that allows the user to input information associated with the current location. More specifically, an application executed by mobile device 150 may allow the user to enter a name, keyword, or other identifying information associated with the current location (e.g. name of an event currently being attended, name of a restaurant, city name, landmark—such as the Statue of Liberty, keywords—such as "Happy Hour," or other information). In another implementation, the current location of the user could be retrieved from the user's calendar (e.g., using a synchronization operation or other data retrieval operation), to determine if the user is likely attending an event or meeting that is not at the location of the recording device. In such a case, the location associated with the user would be determined to be the location of the calendared event, even if the user did not necessarily attend the calendared event. Information received from the user as an input or information determined by the mobile device regarding the current location may be transmitted via network 140 to geolocation service 130 or recording control module 110 for further processing.

In another implementation, mobile device 150 may communicate preference or recording information, or other information related to the functions of content delivery system 100, to recording control module 110. For example, mobile device 150 may be configured to provide confirmation or preference information to recording control module 110 regarding recording behavior. In an implementation, mobile device 150 may be configured to execute an application that prompts the user for confirmation before recording control module 110 begins recording content to ensure that the user would like the content to be recorded. For example, mobile device 150 may provide the user with a graphical user interface that provides the user with information regarding the content and allows the user to indicate whether recording status information associated with the content should be changed. Mobile device 150 may transmit the information received from the user to recording control module 110 via network 140.

Figure 2:
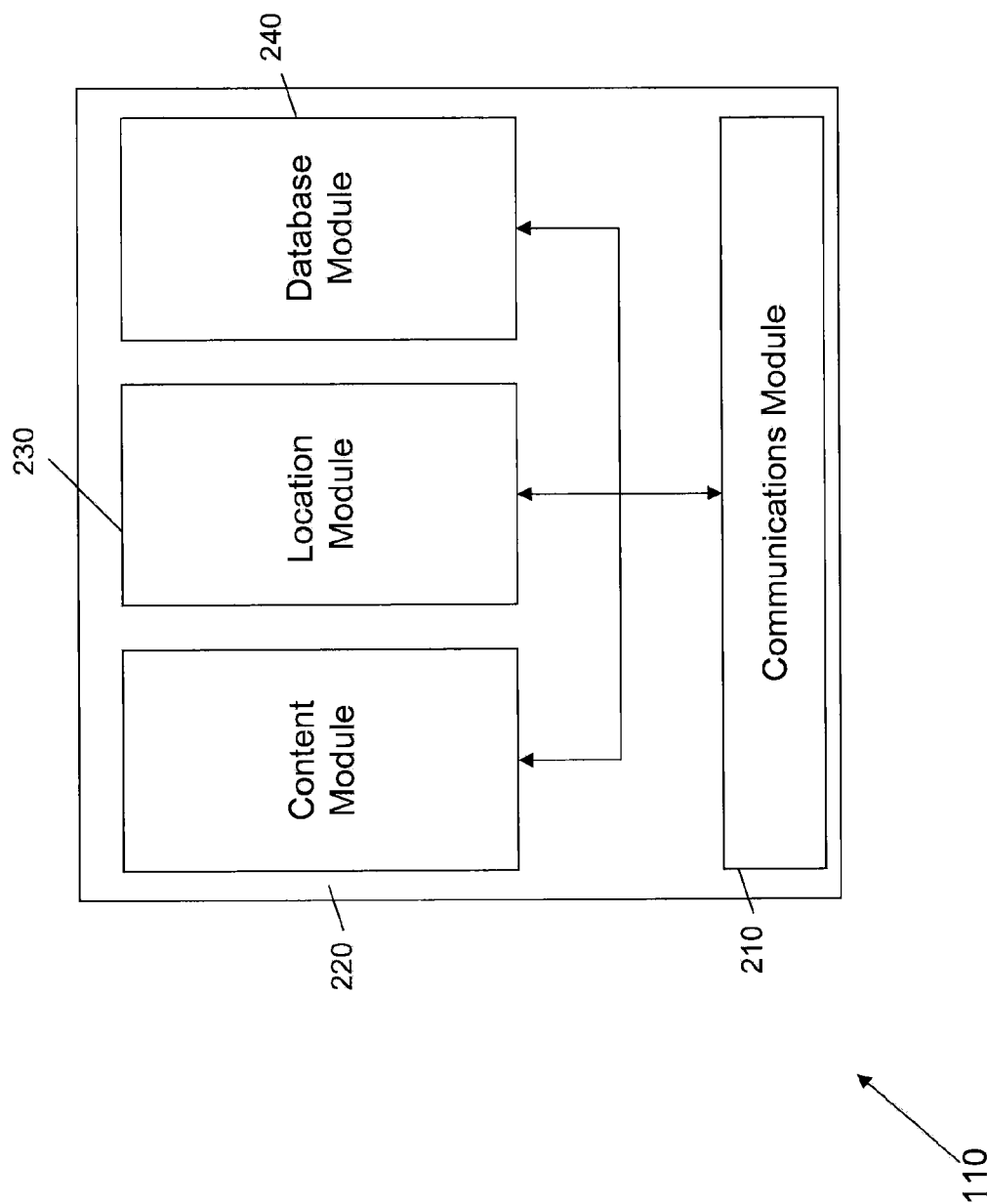
FIG. 2 is a block diagram of an implementation of a recording control module.

FIG. 2 illustrates a block diagram of an implementation of recording control module 110 in greater detail. The example recording control module 110 may include a communications module 210, a content module 220, a location module 230, and a database control module 240.

In an implementation, communications module 210 may be a hardware and/or software interface associated with recording control module 110 configured to facilitate communications among and between various components of content delivery system 100. For example, recording control module 110 may include various internal and external ports associated with input/output functions and network connectivity that facilitate data transfer related to the functions of content delivery system 100. Communications module 210 may be configured to facilitate network communications between content module 220, location module 230, or database control module 240 and one or more resources accessible via network 140. In an implementation, communications module 210 may facilitate communication with a geolocation service 130 to receive location information, as described previously.

Content module 220 of recording control module 110 is configured to facilitate content selection based on preference and content information. According to an implementation, content module 220 may be configured to communicate with preference database 115 via database control module 240. Database control module 240 may be configured to communicate with various database types, including relational and non-relational databases, which may be associated with content delivery system 100. For example, preference database 115 may be configured as a non-relational database operatively coupled to recording control module 110. Database control module 240 may be configured to query preference database 115 based on query information received from content module 220. In another example, preference database 115 may be configured as a non-relational database that includes one or more relational table elements designed to facilitate access to non-relational data. As such, database control module 240 may be configured to query the non-relational database using a relational query structure, such as SQL, to retrieve requested information. Other databases, such as content database 160 accessible via network 140 may also be queried by content module 220 using database control module 240 using similar techniques. The database configurations and connectivity discussed above are exemplary and are not intended to limit the scope of configurations available using implementations described herein.

In an implementation, content module 220 may be configured to use received preference data and content data to determine whether one or more recording settings associated with the content should be modified (e.g., changed from record to not record or vice-versa, changing the duration or time of recording, changing channel of recording, etc.). For example, content module 220 may receive preference data from preference database 115, as discussed previously, that is associated with one or more users. Content module 220 also may receive content information from content database 160 that includes information about content available to the user—for viewing, listening, or recording—via one or more content sources or channels. Content module 220 may evaluate the available content based at least in part on the received preference information associated with one or more users to determine whether DVR device 120 should be instructed to record the content.

According to another aspect, the received preference information may be associated with a single user's behavior with respect to available content. For example, the preference information may include information about content that was previously recorded or previously accessed via DVR device 120 by the user. If similar content is available from the identified content sources, based on keyword information, title information, or other attributes associated with the content, content module 220 may determine that the available content should be recorded by DVR device 120. Such a determination may include, but is not limited to, recording additional multimedia content that is part of a series, content produced by the same director or artist, particular types of sporting events, content related to a particular geographic area, or content that is otherwise determined to be similar based on the available preference information.

According to another aspect, the received preference information may be associated with a plurality of users' behavior with respect to content available from various sources or channels. Content module 220 may be configured to process the behavior of two or more users to determine whether available content should be recorded. For example, if two users share similar historical behavior with respect to movies viewed and recorded via DVR device 120, content module 220 may determine that a new content item that is being recorded by one user may be of interest to the other user. In this case, content module 220 may determine that the content should be recorded by DVR device 120 and, thus, may change a recording status associated with the content.

In another implementation, content module 220 may be configured to identify and change recording status information based on preference information specified by a user. For example, preference database 115 may include preference information that indicates that the user enjoys watching certain sports, such as basketball or football. Content module 220 may evaluate these specified preferences when determining whether content should be recorded by DVR device 120.

In an exemplary implementation, location module 230 may be configured to process location information received via communications module 210 from one or more location information sources. As discussed previously, one source of location information may be geolocation service 130, which may receive location information from one or more users. If the users have granted recording control module 110 access to location information available via geolocation service 130, location module 230 may determine a current location of one or more users as part of the recording-control process. For example, location module 230 may be configured to communicate with geolocation service 130 to determine a user's last-received location to determine whether the user is currently at home and available to view available content that is available from a television content source connected to the DVR device 120. If the user is not currently at home, content available from the television source may be recorded if it meets the user's preferences, as discussed previously. Location module 230 may be configured to perform similar functions based on other location information, as discussed herein.

In another implementation, location module 230 may communicate with geolocation service 130 or other location source to determine additional information regarding a user's location to attempt to record content associated with the location. In one example, location module 230 may communicate with geolocation service 130 via communications module 210 to receive information regarding the user's location that may include information regarding an event, such as a baseball game, that the user is attending. If such event information is available, location module 230 may be configured to communicate with content module 220 to determine whether content related to the event, such as a live broadcast of the game, is available from one or more content sources. If the content is available, recording control module 110 may be configured to change a recording status associated with the content to indicate that DVR device 120 should record the content associated with the event.

Figure 3:
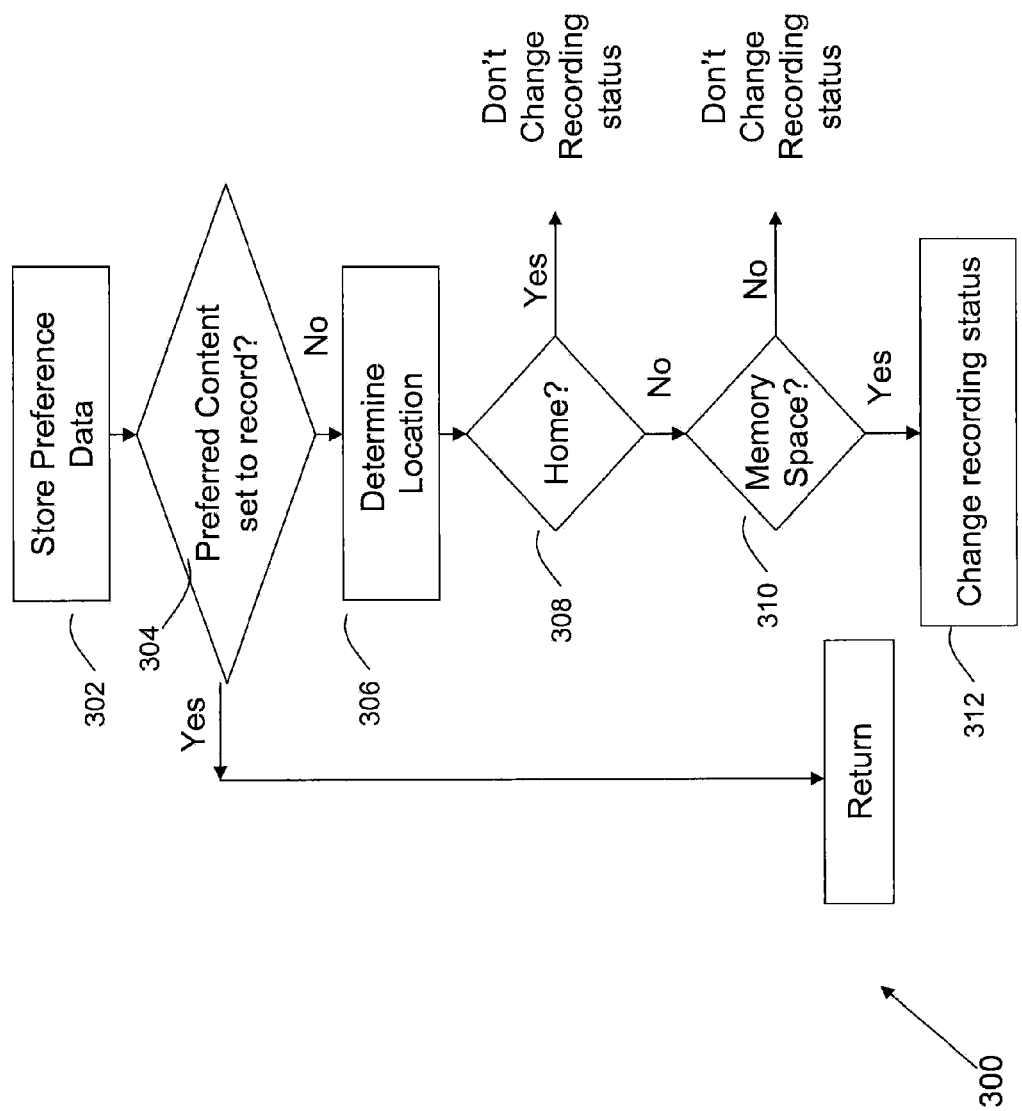
FIG. 3 is a flowchart of an example process for managing the recording of available content using geolocation information.

FIG. 3 is a flowchart illustrating a method 300 for managing the recording of available content via content delivery system 100 according to one implementation. Method 300 illustrates some of the functions performed by content delivery system 100 described above in various implementations. It should be appreciated, however, that while the method outlined in FIG. 3 is directed to managing the recording of content that is presently available or scheduled to become available, the concepts disclosed herein may be applied to content that may be applied in an ongoing manner as additional content is scheduled or otherwise becomes available. Accordingly, methods similar to the one outlined in FIG. 3 may be applied, at least in part, for additional content that becomes available as well.

At step 302, content delivery system 100 stores user preference data in at least one database, such as preference database 115. In one implementation, recording control module 110 may be configured to receive preference data based on user behavior, such as content selections or recording settings made via DVR device 120. For example, recording control module 110 may be configured to receive information related to content currently being viewed by a user via DVR device 120, which may be added to preference database 115. The information may comprise keywords relating to the content, such as a content type (e.g., action, drama, comedy, cartoon, etc.), title (e.g., the Simpsons, Gone With the Wind), subject matter (e.g., Germany, fudge, lions, etc.)., or other keywords information relating to the content being viewed. In another implementation, recording control module 110 may be configured to receive preference information associated with other users via network 140. Preference information related to other users may augment preference data previously stored in preference database 115 based on the preferences and behavior of users who are deemed to be similar to the current user. In another implementation, recording control module 110 may be configured to receive preference information from a mobile device 150. For example, mobile device 150 may be configured to execute an application to provide preference information, via network 140, to recording content module 110.

At step 304, content delivery system 100 determines a recording status associated with one or more content items available to a user. In an implementation, recording control module 110 may communicate with DVR device 120 to determine whether content available to DVR device 120 that is not currently set to be recorded matches preference information stored in preference database 115. For example, preference information received from preference database 115 may indicate that a user generally, typically, or periodically watches a sports event, such as Monday Night Football, every Monday evening. Recording control module 110 may communicate with DVR device 120 to determine whether a status indicator associated with the content indicates that DVR device 120 is currently programmed to record that event. If DVR device 120 is not currently programmed to record the event, recording control module 110 may take additional steps to determine whether the event should be recorded. In other examples, recording control module 110 may determine whether the user typically records or otherwise accesses certain content that is programmed to occur at certain times or may become available at a certain time. As discussed previously with respect to viewing the content, recording control module 110 may determine whether to record the content in this case as well.

At step 306, content delivery system 100 determines a location associated with the user. In one implementation, recording control module 110 may receive geolocation information from a geolocation service 130. As discussed above, geolocation service 130 may be configured to receive location update information from a user via a computing device. Geolocation service 130 may also be configured to determine a user's current location based on, for example, current geolocation coordinates received from a GPS device or determined using other techniques discussed previously. In another implementation, recording control module 110 may receive location information directly from the user via a computing device, such as mobile device 150. As discussed previously, location information may include, but is not limited to geolocation information, event information, or landmark information that may facilitate identifying the location of the user.

At decision 308, recording control module 110 may determine the user's current location with respect to one or more predetermined "stored locations." In an implementation, recording control module 110 may use the received location information to determine whether the user's current location is associated with one or more stored or pre-defined locations, which may be used to determine whether a recording status should be changed for one or more content items. For example, recording control module 110 may receive GPS coordinate information that allows recording control module 110 to determine whether the user is currently at a predetermined location, such as "home" or "at work." The predetermined location may be any location, such as the location of the recording device, a place the user typically uses the recording device, etc. This location may be preprogrammed by a user, set to a default of a home address associated with a user profile or account, determined by a location determination circuit associated with the recording device, etc. According to one aspect, recording control module 110 may have received input from the user regarding the coordinates of these "programmed" locations. According to other aspects, recording control module 110 may determine location information, such as a "home" location based on the current geographic location of the recording control module 110 itself. In another implementation, recording control module 110 may receive the location identifier—e.g. "home"—from a geolocation service 130 in addition to or in lieu of more detailed location information, as discussed previously. According to one aspect, if the received location matches one or more predefined conditions (e.g., within a certain predetermined range), recording control module 110 may be configured not to change recording status information associated with the one or more content items. For example, if the received location information indicates that the user is at "home," recording control module 110 may be configured to not change recording status information associated with one or more content items because the user may not want to record the content. In another example, recording control module 110 may be configured to change recording status information associated with content items if the received location information indicates that the user is at another specified location. In the exemplary implementation illustrated in FIG. 3, if the user is at home, then recording control module 110 is configured to not change recording status information. If the user is not at home, the method 300 continues to decision 310. As discussed previously, this configuration is merely exemplary, and other configurations of recording control module 110 are possible with regard to decision 308.

At decision 310, recording control module 110 may communicate with DVR device 120 to determine whether there is sufficient storage space available to record the identified content items. In one implementation, DVR device 120 may be configured determine whether sufficient storage space exists to record the content in an internal memory device, such as a RAM or Hard Disk Drive (HDD). In another implementation, DVR device 120 may determine whether additional storage space, such as an external HDD or storage resources available via network 140, including cloud-based Internet storage, are available to store the identified content items. If DVR device 120 indicates that sufficient storage space is available, method 300 continues to step 312. If there is insufficient storage space for the content items, method 300 terminates without changing recording status information.

At step 312, recording control module 110 may change a recording status associated with at least one of the identified content items. In an exemplary implementation, recording control module 110 may communicate with DVR device 120 to change a recording identifier stored by DVR device 120 to indicate that the identified one or more content items should be recorded when available to DVR device 120.

Figure 4:
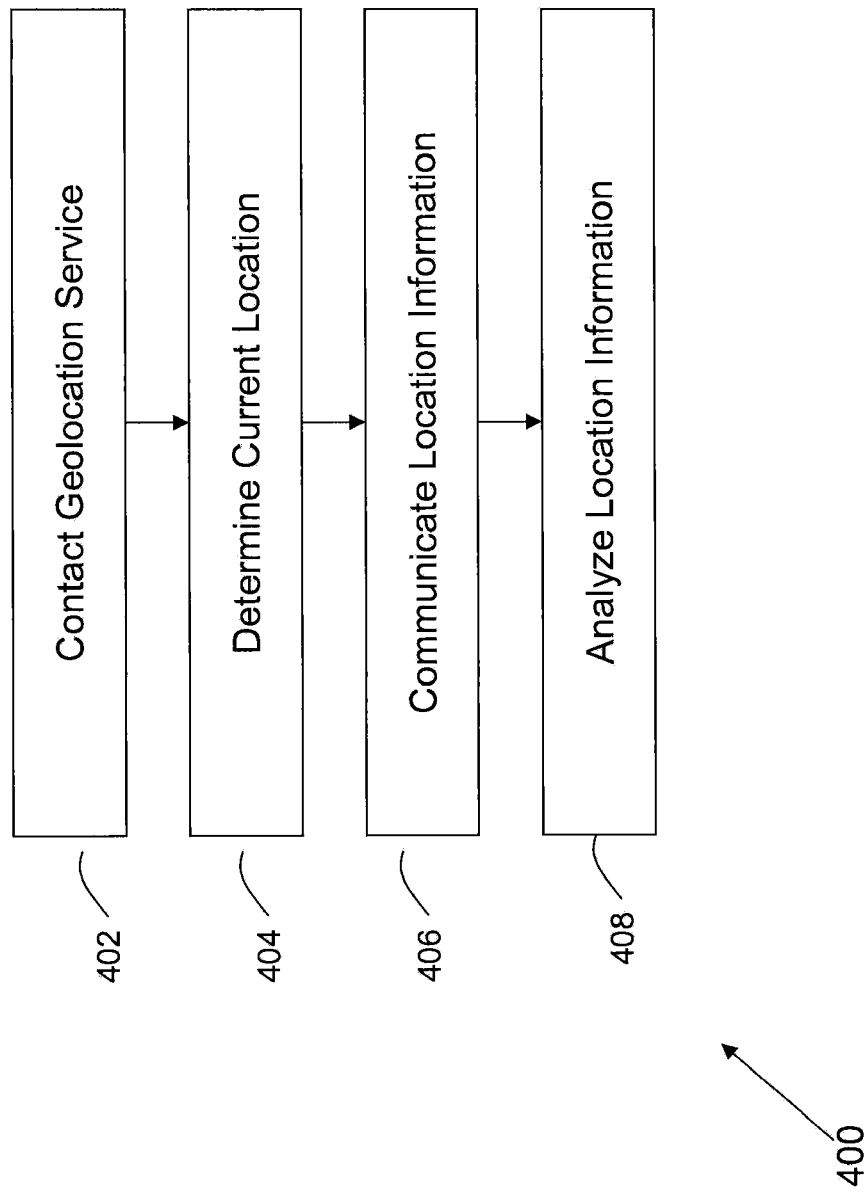
FIG. 4 is a flowchart of an example process for determining location information.

FIG. 4 is a flowchart illustrating a method 400 for determining location information associated with a user via content delivery system 100 according to an implementation.

At step 402, recording control module 110 may contact a geolocation service 130 to request location information associated with a user. In one implementation, recording control module 110 may transmit a query to a geolocation service 130 via network 140 regarding the last-updated status of a user. For example, recording control module 110 may query geolocation service 130 to request current location information or the most recent location update received by the geolocation service 130 from the user.

At step 404, geolocation service 130 may determine a current location associated with the user. In one implementation, geolocation service 130 may be configured to receive continuous or periodic updates from a device, such as mobile device 150, associated with a user. Geolocation service 130, thus, may communicate with mobile device 150 to receive updated information regarding the current location of the user and the mobile device 150. In another implementation, geolocation service 130 may be configured to prompt the user for location information via mobile device 150. For example, an application associated with geolocation service 130 configured to be executed by mobile device 150 may allow a user to enter location information when the user chooses to do so. In another example, the application may be configured to prompt the user, periodically or in response to a request for location information, to allow the application to share the user's current location information with the device or service requesting the information.

At step 406, geolocation service 130 may communicate location information to recording control module 110. According to an implementation, geolocation service 130 may be configured to respond to a request from recording control module 110 for location information regarding a user. Geolocation service 130 may transmit information such as geolocation information, event information, or descriptive information provided by the user that may be associated with the request from recording control module 110. For example, geolocation service 130 may include geolocation information that includes the current coordinates of the user in a response to the request from recording control module 110. In another example, geolocation service 130 may transmit an identifier associated with the user's current location, such as "work," in response to the request from recording control module 110. One of ordinary skill in the art would recognize that in other examples additional combinations of information related to the user's location may be generated by geolocation service 130 in response to the request from recording control module 110 to provide location information.

At step 408, recording control module 110 may analyze the received location information. In one implementation, recording control module 110 may be configured to analyze received geolocation information to determine whether the information, such as position coordinates, are associated with a predefined location description, such as "home" or "work." For example, if recording control module 110 is configured to store coordinate information associated with a user's "home" location and "work" location, recording control module 110 may analyze the received geolocation information to determine whether the received information matches previously stored information. If the information matches, recording control module 110 may determine that the user is at that location.

In another implementation, recording control module 110 may be configured to receive location identification information that specifies the user's location using a description. For example, the received location information may be an event name or identifier, such as "home" or "work." Recording control module 110 may analyze the received identifier to determine whether a pre-defined action is associated with the identifier or received information. For example, a user may specify that recording control module 110 should not record content if the user is at home, or the user may specify that the user should record content if the user is at work. In addition, recording control module 110 may determine whether the location information identifies an event that may have associated content available via network 140. In an implementation, recording control module 110 may analyze the received location identification information and may communicate with DVR device 120, content database 160, or other accessible content sources to determine whether additional content is available that should be recorded, as described previously.

Figure 5:
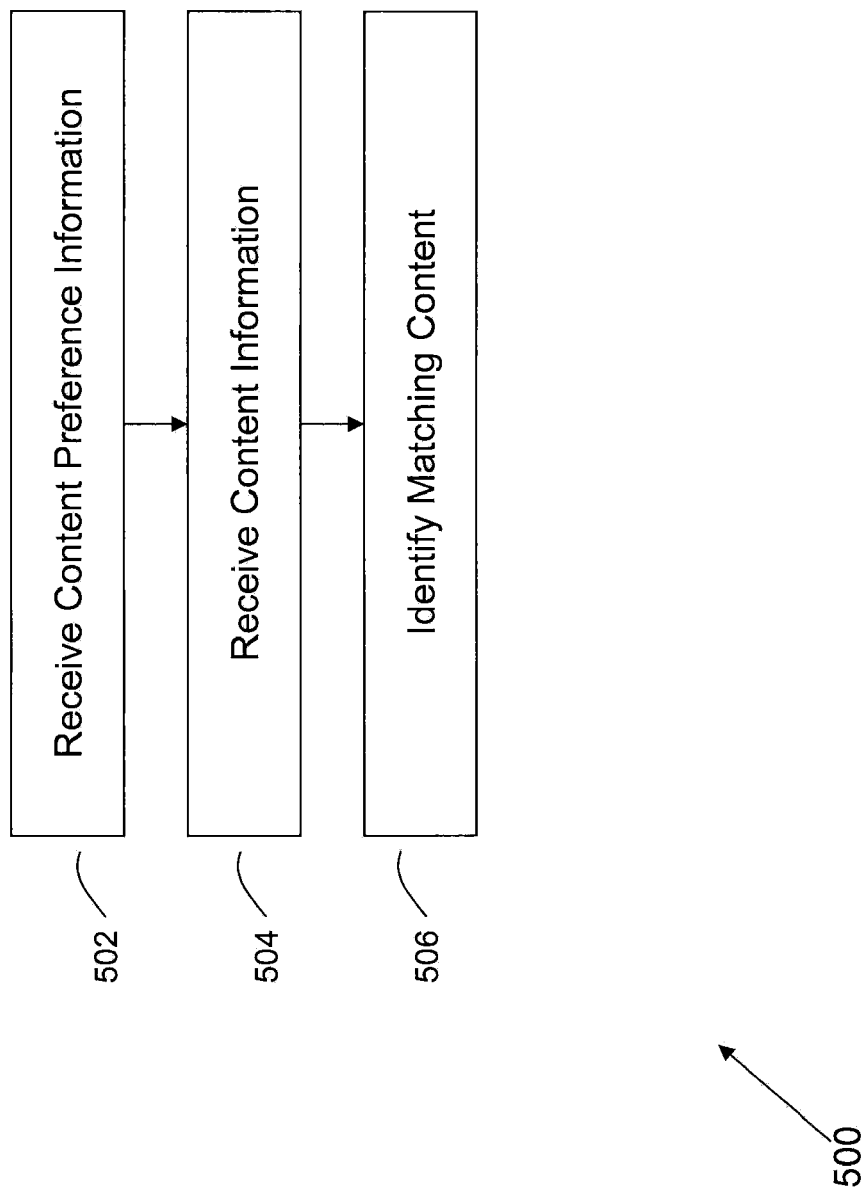
FIG. 5 is a flowchart of an example process for determining user preference information.

FIG. 5 is a flowchart illustrating a method 500 for evaluating user preference information using recording control module 110 according to an implementation.

At step 502, recording control module 110 may receive content preference information. In an implementation, recording control module 110 may receive content preference information from preference database 115. Received content preference information may relate to one or more users and may include information such as preferences specified by the user, historical behavior information regarding content accessed or recorded, or other information regarding content that may be of interest to one or more users. According to one aspect, information stored by or accessible via preference database 115 may relate to multiple users who have been determined to have preferences similar to those of the user associated with recording module 110. For example, preference database 115 may include information related to users who have viewed, accessed, or recorded content similar to the user associated with recording control module 110. Preference information associated with such users may be used to determine whether available content may be of interest to the user.

In another implementation, recording control module 110 may receive content preference information from DVR device 120 related to content accessed by a user via DVR device 120. DVR device 120 may facilitate a user's access to various content, including television shows, movies, audio content, and other multimedia content. Such historical information may be stored in preference database 115 by recording control module 110 for subsequent access related to determining whether available content should be recorded. In one example, recording control module 110 may receive content preference information from DVR device 120 in real-time or substantially real-time as a user accesses content via DVR device 120. In another example, recording control module 110 may be configured to receive content preference information from DVR device 120 on a periodic basis or subsequent to a request from recording control module 110 regarding recently accessed content.

At step 504, recording content module 110 may receive available content information. In an implementation, recording content module 110 may communicate with DVR device 120, content database 160, or other content sources, such as content sources available via network 140. In one example, a content source accessible via the Internet may include a multimedia source configured to stream content to connected devices, such as recording content module 110 and DVR device 120. In an implementation, one or more content sources accessible by recording content module 110 may provide a listing of available content. The listing may include information related to individual content items, such as content name, type, genre, keywords, or other identification or classification information. In one example, the received listing may represent content available over a pre-defined future period of time, such as 24 hours, 2 days, 1 week, etc., to show content items that may be of interest to the user in the relatively near future.

At step 506, recording control module 110 determines whether available content matches preference information. According to one implementation, recording control module 110 may sort or identify prospective content items in one or more stages by filtering the content items according to the information associated with the content. For example, if user preference information suggests that the user dislikes certain sports, recording control module 110 may filter out all content related to that sport based on the information received for those content items. Similarly, if users preference information indicates that the user always watches broadcasts of certain sports using DVR device 120, content items containing information related to those sports may be included as potential matches. One of ordinary skill in the art would recognize that such filtering may be accomplished in multiple stages based on various preference information or may be accomplished as a single operation configured to determine whether available content matches the preference information. Furthermore, one of ordinary skill in the art would recognize that matching operations may be performed as query operations directed to databases, such as preference database 115 and content database 160 or may be local operations performed on data structures associated with or configured to store data received from one or more databases. For example, if matching is to be performed using query operations on a database, data retrieved from one database may be configured to act as query terms used to query a second database. In another example, a single query may be generated to perform a join operation over database content to retrieve matching content in a single query. These alternatives for querying data sources for data are merely exemplary, and other alternative implementations of a matching operation over several data sets would be understood to one of ordinary skill in the art.

Figure 6:
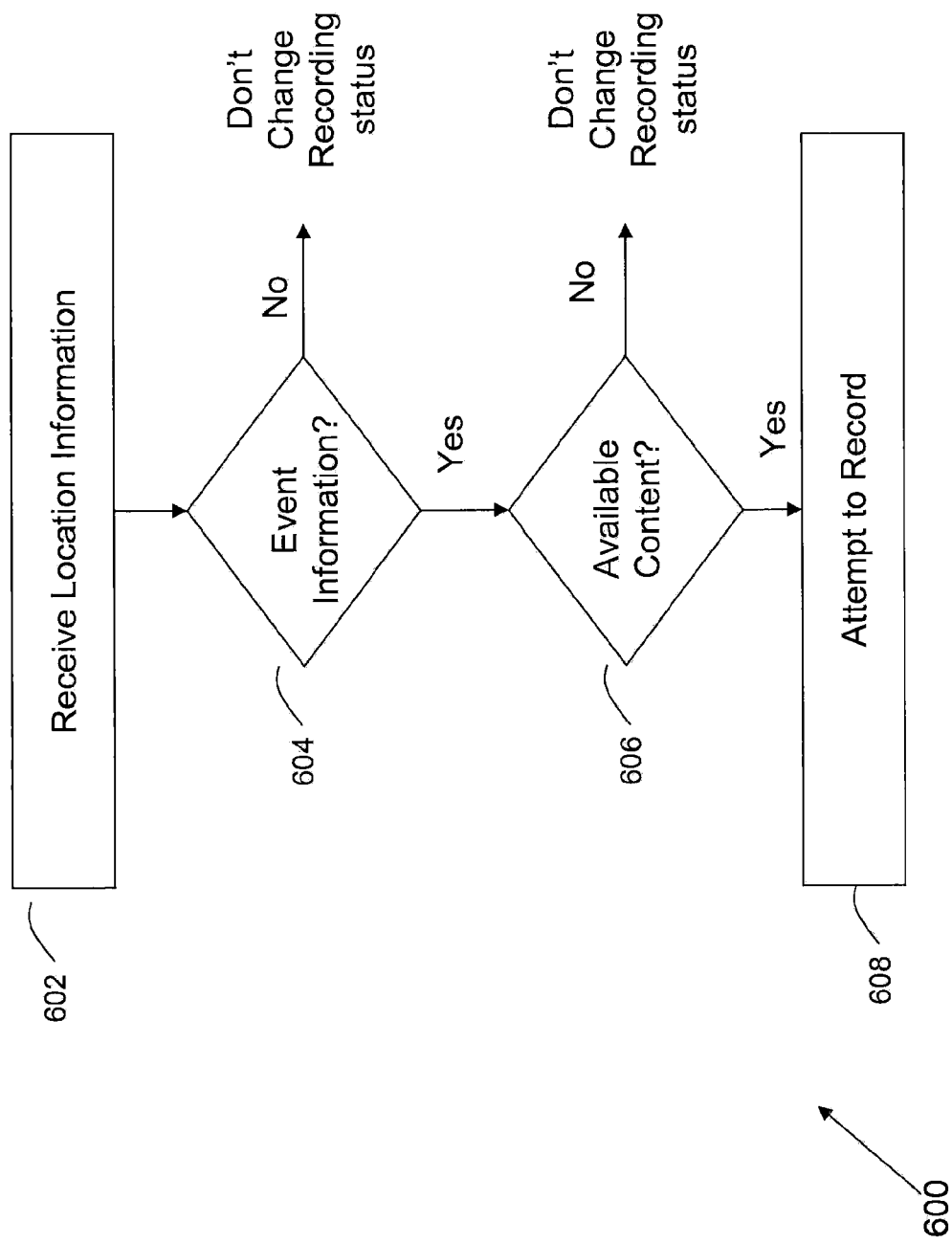
FIG. 6 is a flowchart of an example process for matching event information with content information.

FIG. 6 is a flowchart illustrating a method 600 for matching event information with content information using content delivery system 100 according to one implementation. At step 602, recording content module 110 may receive location information, as described previously and as depicted in FIG. 4.

At decision 604, recording content module 110 may determine whether the location information includes or relates to event information. The system may be configured to store this location and event information in a user profile or account to be used by other processes. According to one implementation, received location information may include descriptive information related to an event that the user is attending. For example, if the user is attending a football game, the location information may include the names of the teams and location information associated with the game. The location information may include geolocation information associated with the physical location of the game or keyword information, such as a stadium or arena name, that allows recording content module 110 to determine additional information related to the user's location. Recording content module 110 may communicate with geolocation service 130 or other location resources, such as mapping applications or searching applications, accessible locally to recording content module 110 or accessible via network 140, to facilitate a determination by recording content module 110 regarding the location of the user or event information related thereto. If recording content module 110 determines that the received location information does not relate to an event, method 600 terminates without changing recording status information.

At decision 606, recording control module 110 determines whether content related to the event is available. According to one aspect, if recording content module 110 determines that information received regarding the user's location includes information related to an event, it may be configured to search for related content available via one or more content sources, as discussed previously with regard to content identification. In one implementation, determined event information may include one or more keywords or attributes associated with the event that may facilitate a determination by recording control module 110 of available related content. For example, determined event location information may include a sport or a team name that allows recording control module 110 to query one or more content sources for content that may relate to events involving the identified sport or team. If content related to the event is not available, method 600 terminates without changing recording status information.

At step 608, recording content module 110 attempts to record the event-related content, as described in an exemplary implementation in method 300 of FIG. 3.

Figure 7:
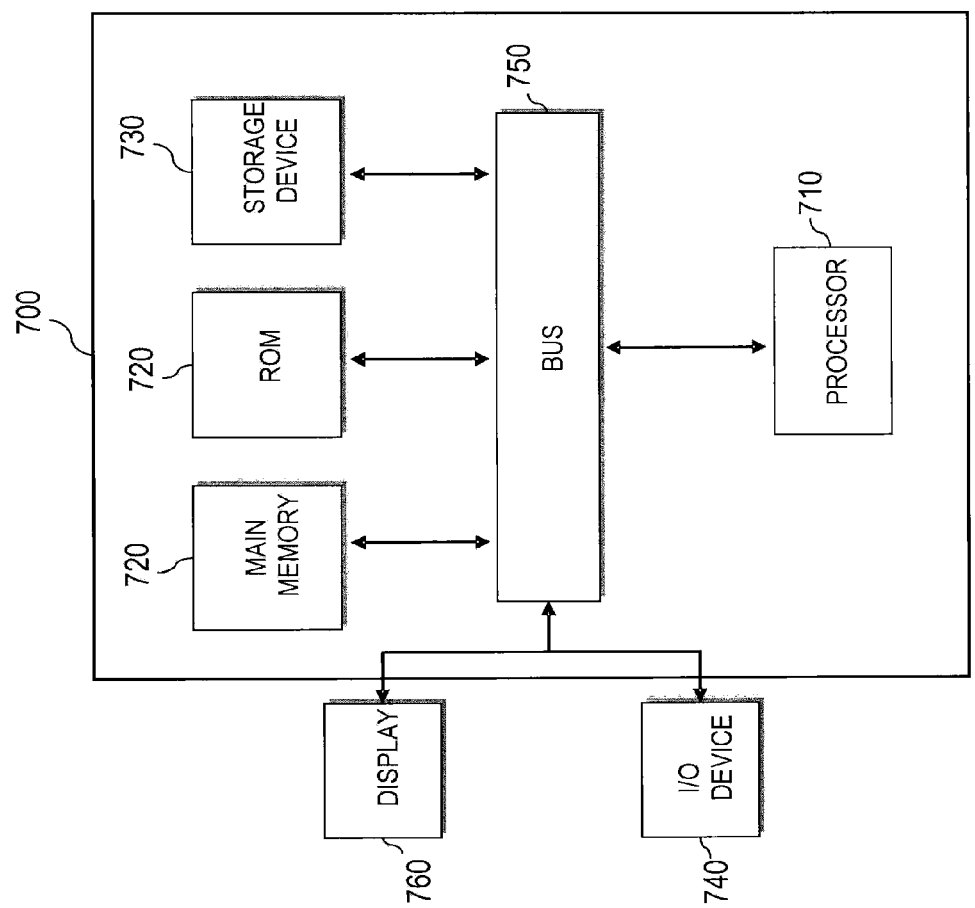
FIG. 7 is a block diagram of an example computer system that can be used to control content recording.

FIG. 7 is a block diagram of an example computer system 700 that can be used to control content recording. The system 700 includes a processor 710, a memory 720, a Read-Only Memory (ROM) 770, a storage device 730, and an input/output device 740. Each of the components 710, 720, 730, 740, and 770 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can include, for example, a hard disk device, an optical disk device, or some other large capacity storage device.

The input/output device 740 provides input/output operations for the system 700. In one implementation, the input/output (I/O) device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 760. Other implementations, however, can also be used, such as mobile computing devices, mobile communication devices, set-top box television client devices, etc.

The recording control module 110, DVR device 120, and/or geolocation service 130 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The content delivery system 100 and/or recording control module 110 can be distributively implemented over a network, such as a server farm, or can be implemented in a single computer device.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of selectively recording media content, the method comprising:
   receiving, at a recording control module, a location associated with a mobile device corresponding to a user remote from a location of the recording control module, wherein the mobile device has been associated with a digital recording device corresponding to the user, and wherein the digital recording device is in communication with the recording control module;
   determining, using the recording control module, an event associated with the location;
   querying, using the recording control module, a content source for media content associated with the determined event;
   determining, using the recording control module, a recording status for a media content item indicative of whether the media content item will be recorded; and
   modifying the recording status to indicate that the media content item is to be recorded on the digital recording device based, at least in part, on the location associated with the mobile device.

2. The method of claim 1 further comprising:
   transmitting, from the recording control module, confirmation information related to the media content item to the remote mobile device.

3. The method of claim 2 wherein transmitting confirmation information further comprises:
   determining, using the recording control module, a start time associated with the media content item; and
   transmitting, from the recording control module, the confirmation information before the determined start time.

4. The method of claim 2 further comprising:
   updating, using the recording control module, a user preference based, at least in part, on the determined event.

5. The method of claim 1 wherein the determination of the event associated with the location comprises:
   communicating, using the recording control module, with a geolocation service,
   receiving, from the geolocation service, keyword information associated with the received location, and determining, using the recording control module, an event based, at least in part, on the keyword information.

6. The method of claim 5, wherein the keyword information comprises a stadium or arena name.

7. The method of claim 1 wherein the determination of the event associated with the location is based, at least in part, on user preference information.

8. The method of claim 7, wherein the user preference information is based, at least in part, on at least one of historical viewing information or historical recording information.

9. A method of selectively recording media content, the method comprising:
   receiving, at a recording control module, a location associated with a mobile device remote from a location of the recording control module;
   determining, using the recording control module, an event associated with the location;
   querying, using the recording control module, a content source for media content associated with the determined event;
   determining, using the recording control module, a recording status for a media content item indicative of whether the media content item will be recorded; and
   modifying the recording status to indicate that the media content item is to be recorded based, at least in part, on the location associated with the mobile device by communicating with a digital recording device to change a recording identifier stored by the digital recording device to indicate that the media content item should be recorded when available to the digital recording device.

10. A non-transitory computer readable storage medium having computer-executable instructions stored thereon that, when executed by a processor, cause the processor to perform operations comprising:
    receiving a location associated with a remote mobile device corresponding to a user, wherein the mobile device has been associated with a digital recording device corresponding to the user;
    determining an event associated with the location and based, at least in part, on user preference information;
    querying a content source for media content associated with the determined event;
    determining a recording status for a media content item indicative of whether the media content item will be recorded; and
    modifying the recording status to indicate that the media content item is to be recorded on the digital recording device based, at least in part, on the location associated with the mobile device.

11. The non-transitory computer readable storage medium of claim 10, wherein the determination of the event associated with the location comprises:
    communicating with a geolocation service,
    receiving, from the geolocation service, keyword information associated with the received location, and
    determining, using the recording control module, an event based, at least in part, on the keyword information and the user preference information.

12. The non-transitory computer readable storage medium of claim 11, wherein the keyword information comprises a stadium or arena name.

13. The non-transitory computer readable storage medium of claim 10, wherein the user preference information is based, at least in part, on at least one of historical viewing information or historical recording information.

14. A non-transitory computer readable storage medium having computer-executable instructions stored thereon that, when executed by a processor, cause the processor to perform operations comprising:
    receiving a location associated with a remote mobile device;
    determining an event associated with the location and based, at least in part, on user preference information;
    querying a content source for media content associated with the determined event;
    determining a recording status for a media content item indicative of whether the media content item will be recorded; and
    modifying the recording status to indicate that the media content item is to be recorded based, at least in part, on the location associated with the mobile device by communicating with a digital recording device to change a recording identifier stored by the digital recording device to indicate that the media content item should be recorded when available to the digital recording device.

15. A selective media content recording system comprising:
    a processor; and
    a storage medium storing instructions that, when executed by the processor, cause the processor to perform operations comprising:
    storing user preference information, the user preference information based, at least in part, on at least one of historical viewing information or historical recording information,
    determining a media content item based, at least in part, on the stored user preference information,
    receiving, from a mobile device corresponding to a user, a location associated with the mobile device, wherein the mobile device has been associated with a digital recording device corresponding to the user,
    determining whether the mobile device is remote from the digital recording device,
    communicating with the digital recording device to determine a recording status for the determined media content item indicative of whether the media content item will be recorded, and
    communicating with the digital recording device to modify the recording status to indicate that the media content item is to be recorded in response to determining that the mobile device is remote from the digital recording device.

16. The selective media content recording system of claim 15, wherein determining whether the mobile device is remote from the digital recording device comprises determining that the mobile device is remote from a predetermined location associated with the digital recording device.

17. The selective media content recording system of claim 15, wherein the storage medium stores instructions that cause the processor to perform operations further comprising:
    transmitting the location associated with the mobile device to a geolocation service,
    receiving, from the geolocation service, keyword information associated with the location, and
    determining whether the media content item is associated with the event based, at least in part, on the keyword information.

18. The selective media content recording system of claim 17, wherein the keyword information comprises a stadium or arena name.

19. The selective media content recording system of claim 17, wherein the storage medium stores instructions that cause the processor to perform operations further comprising:

transmitting confirmation information related to the media content item to the remote mobile device.

20. The selective media content recording system of claim 15, wherein the storage medium stores instructions that cause the processor to perform operations further comprising:

querying an events database using the received location from the mobile device to identify an event associated with the received location, and determining whether the media content item is associated with the event.

21. A selective media content recording system comprising:

a processor; and a storage medium storing instructions that, when executed by the processor, cause the processor to perform operations comprising:

storing user preference information, the user preference information based, at least in part, on at least one of historical viewing information or historical recording information, determining a media content item based, at least in part, on the stored user preference information, receiving, from a mobile device, a location associated with the mobile device, determining whether the mobile device is remote from a digital recording device, communicating with the digital recording device to determine a recording status for the determined media content item indicative of whether the media content item will be recorded, and communicating with the digital recording device to modify the recording status to indicate that the media content item is to be recorded when available to the digital recording device by changing a recording identifier stored by the digital recording device in response to determining that the mobile device is remote from the digital recording device.

* * * * *